US 7,180,597 B2

(12) United States Patent
Thomas et al.

(10) Patent No.: US 7,180,597 B2
(45) Date of Patent: Feb. 20, 2007

(54) IMAGING ASSEMBLY WITH SYNTHETIC APERTURE OPTICAL INSTRUMENT

(75) Inventors: Eric Thomas, Mandelieu (FR); Philippe Blanc, Mandelieu (FR)

(73) Assignee: Alcatel, Paris (FR)

( * ) Notice: Subject to any disclaimer, the term of this patent is extended or adjusted under 35 U.S.C. 154(b) by 287 days.

(21) Appl. No.: 10/496,950

(22) PCT Filed: Nov. 21, 2002

(86) PCT No.: PCT/FR02/03989

§ 371 (c)(1),
(2), (4) Date: Jun. 18, 2004

(87) PCT Pub. No.: WO03/046642

PCT Pub. Date: Jun. 5, 2003

(65) Prior Publication Data

US 2004/0257263 A1    Dec. 23, 2004

(30) Foreign Application Priority Data

Nov. 27, 2001    (FR) .................................. 01 15303

(51) Int. Cl.
*G01B 9/02*       (2006.01)
(52) U.S. Cl. ...................................... 356/450; 356/450
(58) Field of Classification Search ................. 356/450
See application file for complete search history.

(56) References Cited

U.S. PATENT DOCUMENTS

| 4,136,954 A | 1/1979 | Jamieson |
| 3,556,630 A | 1/1997 | Wilczynski |

OTHER PUBLICATIONS

E. Dereniak et al, "Application of a Synthetic Aperture Optical System to Infrared Imaging", Applied Optics, vol. 12, No. 3, Mar. 1973, pp. 487-492, XP002220216.

Primary Examiner—Gregory J. Toatley, Jr.
Assistant Examiner—Michael A. Lyons
(74) Attorney, Agent, or Firm—Sughrue Mion, PLLC

(57) ABSTRACT

The invention concerns an imaging assembly comprising a synthetic aperture instrument including a plurality of pupils separated by sampling detection means. The sampling frequency values in column (u) and in line (v) are less than the values corresponding to the Shannon criterion, and are such that zones of response modulation transfer function resulting from sampling are inserted in zones of null modulation transfer function of the central section of the modulation transfer function, so that said zones do not form an intersection and, in a central section of smaller dimension ($22_0$) than the central section ($20_{0,0}$) of the modulation transfer function, the set of zones representing the central section of the modulation transfer function is present. The acquired image spectrum is reconfigured so as to reconstruct said image.

15 Claims, 6 Drawing Sheets

IMAGING ASSEMBLY WITH SYNTHETIC APERTURE OPTICAL INSTRUMENT

BACKGROUND OF THE INVENTION

The present invention relates to an imaging assembly with a synthetic aperture optical instrument.

Using imaging optical systems with synthetic apertures is envisaged in the aerospace industry in particular. These systems consist in a combination of subsystems, each of small size, that achieves practically the same result as a large optical system. A system made up of small subsystems is easier to produce than a large optical system and causes less problems to launch by means of a satellite. An imaging system of this type has a telescope function, for example.

The signals obtained by each of the instruments are generally combined by Fizeau or Michelson interferometry.

FIG. 1 represents by way of illustration one pupil configuration of a three-telescope interferometer.

The main optical characteristic of a synthetic aperture optical device is determined by the diameter of the pupils 10, 12, 14 and their respective positions. In this example, the pupils all have the same diameter D' and their centers are disposed in accordance with an equilateral triangle of side length B'.

It is known that synthetic aperture devices of this kind may have a modulation transfer function (MTF) whose support is discontinuous if the distance between the pupils is sufficiently large compared to their diameter, i.e. this function features cancellation ranges. FIG. 2 represents the modulation transfer function of the instrument represented in FIG. 1.

The modulation transfer function of an optical device is the response of the instrument to the diverse input spatial frequencies. In the FIG. 2 diagram, the column spatial frequencies are represented on the abscissa axis u and the row frequencies are represented on the ordinate axis v. The support of the modulation transfer function of the instrument represented in FIG. 1 therefore features seven circular regions, each having a diameter 2D (where $D=D'/\lambda$, $\lambda$ being the wavelength): a "central" region LL for low column and line frequencies (L), and six peripheral circular regions: LH, HH, H'H, L'H, H'H' and HH'. The notation LH means that the region relates to low row frequencies (L) and high column frequencies (H). Similarly, the notation HH, H'H, H'H' and HH' signifies high row and column frequencies.

The centers of the peripheral circular regions are on a circle of diameter 2B (where $B=B'/\lambda$) centerd on the origin.

The line joining the centers of the circles HH and H'H' is at an angle of 60° to the abscissa axis and, similarly, the line joining the centers of the circles H'H and HH' is at an angle of 120° to the abscissa axis.

In practice, the images are sampled with a spatial sampling frequency that may be different for the rows and the columns. To prevent aliasing, i.e. loss of information, it is necessary to comply with Shannon's theorem, i.e. the column sampling frequency must be greater than or equal to twice the maximum frequency of the spectrum to be reproduced, i.e. twice the distance I (FIG. 2) such that $I=B+D$, and, the row sampling frequency must be equal to twice the distance $\mu$ (FIG. 2), where $\mu=\sqrt{3}B/2+D$.

Accordingly, when the column sampling frequency is $2B+2D$ and the row sampling frequency is $\sqrt{3}B/2+D$, an image is obtained for which the support of the spectrum is of the type represented in FIG. 3 with a central spectrum section comprising the seven circular regions LL, L'H, LH, HH, H'H', H'H and HH' and delimited in FIG. 3 by a rectangle $20_{0,0}$. The spectrum also comprises a set of replicas identical to the central section offset on the abscissa axis by an integer number of column sampling frequencies and on the ordinate axis by an integer number of row sampling frequencies.

Accordingly, as may be seen in FIG. 3, the central rectangle $20_{0,0}$ of the usable portion of the spectrum is replicated to form paving with slabs identical to the central slab $20_{0,0}$ constituting replicas $20_{1,0}$, $20_{0,1}$, $20_{1,1}$, $20_{0,-1}$, $20_{-1,1}$, etc.

Until now, it has been considered that the sampling frequency could not fall below values corresponding to those of FIG. 3 since, for lower sampling frequencies, the MTF regions of the replicas overlap the MTF regions of the central section $20_{0,0}$, which would lead to aliasing, i.e. to degrading of the information.

The number of pixels (picture elements) necessary for sampling the image is, of course, a direct function of the sampling frequency. As a result of this, the higher the sampling frequency, the higher the number of pixels that is necessary.

SUMMARY OF THE INVENTION

The invention allows a significantly lower sampling frequency to be used without aliasing. In other words, at constant field, the invention reduces the number of pixels necessary to reproduce images and to increase the quality (signal to noise ratio) of the image.

The invention exploits the fact that the central region $20_{0,0}$ has large portions with a null modulation transfer function.

The method conforming to the invention consists in:

conferring on the column and row sampling frequencies values lower than the sampling frequencies that are determined by the Shannon criterion, these lower sampling frequencies producing replicas occupying the null transfer function portions of the central section of the spectrum, without intersecting with the non-null transfer function regions of the central section, the set of different useful regions nearest the origin then forming a new central section smaller than the original central section, and in order to reconstruct the image, reconfiguring the small central section according to the original central section.

Thus row and column sampling frequencies are chosen whose values are such that replicas overlap this central section, but do not intersect with the (circular) non-null modulation transfer function regions (i.e. the non-null MTF regions of the replicas fill null value regions of the central section of the MTF), and there are selected in the central section filled in this way those of the regions that are nearest the frequency origin and which may be used to reconstruct the modulation transfer frequency, and this new central section, which is smaller than the original central section, is reconfigured so that it corresponds, for the purpose of image reconstruction, to the original central section.

In the case of an onboard instrument, the image is preferably reconstructed on the ground.

It can be shown that in the case of the interferometer system with three pupils represented in FIG. 1, the row sampling period may be increased by a factor of approximately 1.62 and the column sampling period may be increased by a factor of approximately 1.67. Thus, at constant field, the total number of pixels necessary for sampling the image is reduced by a factor of 2.7.

Accordingly, the invention generally provides an imager assembly comprising a synthetic aperture instrument comprising a plurality of separate pupils with sampling detection means, characterized in that:

the values of the column and row sampling frequencies are less than the values conforming to the Shannon criterion and are such that modulation transfer function regions of replicas resulting from sampling are inserted into null modulation transfer function regions of the central section of the modulation transfer function so that these regions do not intersect and a central section smaller than the central section of the modulation transfer function contains all the regions representing the central section of the modulation transfer function, and it comprises means for reconfiguring the spectrum of the image acquired in order to reconstruct it, said means being used to position the regions of the smaller central section so that they correspond to the positions of the regions of the original central section.

In one embodiment the values of the sampling frequencies are such that in at least the row direction or the column direction the regions of the smaller central section of the modulation transfer function are tangential.

The instrument may comprise three pupils of diameter D' whose centers are disposed in accordance with an equilateral triangle of side length B' such that $2D'=\sqrt{3}B'/4$, the column sampling frequency being equal to 3B/2 and the row sampling frequency being equal to 6D, where $B=B'/\lambda$ and $D=D'/\lambda$, $\lambda$ being a wavelength.

A variant of the instrument comprises four pupils each of which has a diameter D' and whose centers are disposed in accordance with a square of diagonal length B' such that: $2D'=B'/2$, the column and row sampling frequencies being 6D, where $D=D'/\lambda$, $\lambda$ being a wavelength.

The assembly is of the interferometer type, in particular of the telescope type, for example.

The invention also provides a method of determining the optical sampling frequency of an imaging assembly comprising a synthetic aperture type instrument comprising a plurality of pupils, such as an interferometric telescope, which method is characterized in that said sampling frequency is chosen with a value lower than that imposed by the Shannon criterion and such that replicas adjoining the central section of the modulation transfer function overlap the central section so that the non-null transfer function regions of the replicas are inserted into null transfer function regions of the central section without intersecting with a non-null transfer function region and so that a smaller section inside the central section contains all the regions useful for reconstructing the modulation transfer function.

In one embodiment the row and column sampling frequency is chosen so that in at least the row direction or the column direction adjacent regions of the smaller section are tangential.

The invention further provides a method of reconstructing images in an imaging assembly for which the sampling frequency corresponds to the method defined above, in which method the modulation transfer function is re-established from regions in the smaller section.

BRIEF DESCRIPTION OF THE DRAWINGS

Other features and advantages of the invention will become apparent in the course of the description of certain embodiments of the invention given with reference to the appended drawings, in which.

DETAILED DESCRIPTION OF THE INVENTION

Figure 4:
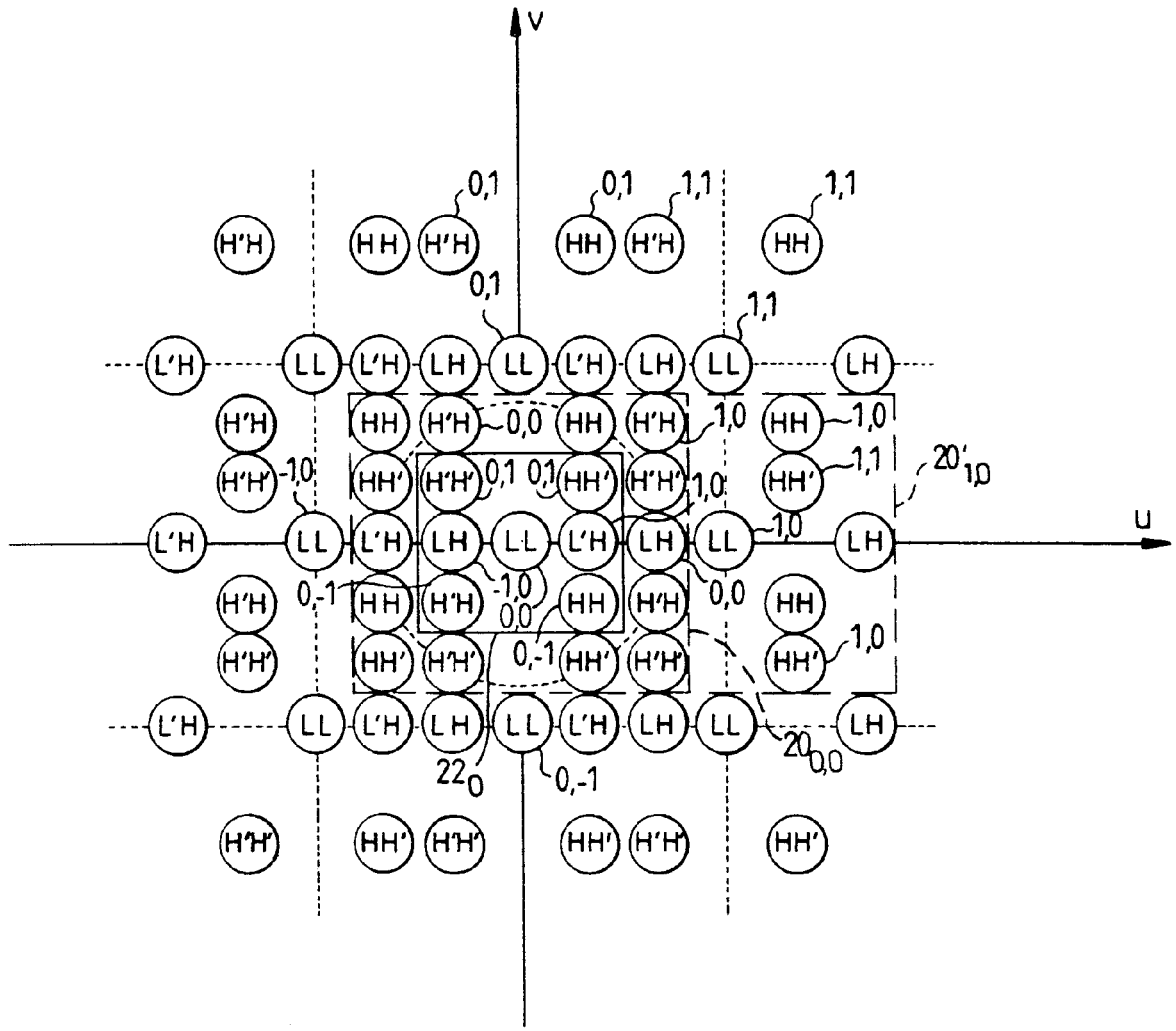
FIG. 4 represents, for the interferometer represented in FIG. 1, the support of the spectrum resulting from a sampling frequency determined using the method according to the invention.

Refer first to FIG. 4.

Figure 1:
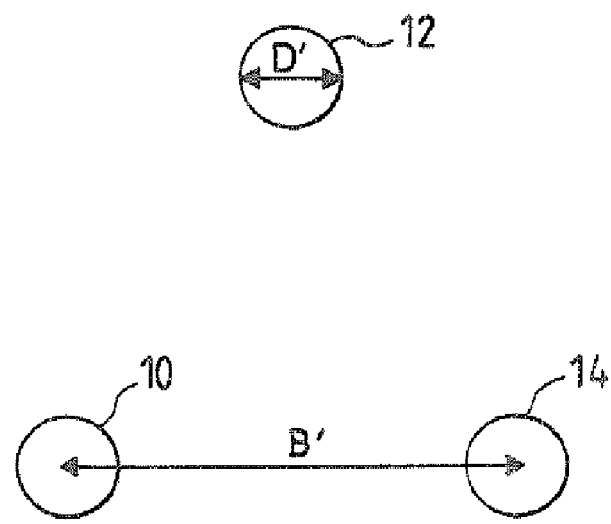
FIG. 1, already described, represents an interferometer with three pupils.

In this example, corresponding to the interferometer with three pupils represented in FIG. 1, a column sampling frequency is chosen with the value 3B/2 and a row sampling frequency is chosen with the value 6D.

In this case, as may be seen in FIG. 4, the (replica) section $20'_{1,0}$, for which the center of the central region LL has the abscissa 1 and the ordinate 0, overlaps the central section $20_{0,0}$. Accordingly, the regions H'H', L'H and H'H of this replica $20'_{1,0}$ are inside the central section $20_{0,0}$. In particular, it may be seen that the region $L'H_{1,0}$ is between the regions $LL_{0,0}$ and $LH_{0,0}$. The subscripts used for the regions correspond to the co-ordinates of the center of the central region LL of the corresponding replica.

Similarly, the region $LH_{-1,0}$ is between the regions $L'H_{0,0}$ and $LL_{0,0}$. It may also be seen that the region $H'H'_{0,1}$ is between the regions $LH_{-1,0}$ and $H'H_{0,0}$ and is tangential to them. Similarly, the region $HH'_{0,1}$ is between the regions $HH_{0,0}$ and $L'H_{1,0}$ and is tangential to them. Symmetrically, the region $H'H_{0,-1}$ is between the regions $LH_{-1,0}$ and $H'H'_{0,0}$ and is tangential to them; finally, the region $HH_{0,1}$ is between the regions $L'H_{1,0}$ and $HH'_{0,0}$ and is tangential to them.

It can therefore be seen that a central section $22_0$ that is smaller than the central section $20_{0,0}$ contains the seven modulation transfer function regions: LL, L'H, LH, HH', H'H, HH and H'H'; the region LL comes from central section 0,0, the regions H'H' and HH' come from the replica 0,1, the regions H'H and HH come from the replica 0,−1, the region L'H comes from the replica 1,0, and the region LH comes from the replica −1,0.

Accordingly, although row and column sampling frequencies have been chosen that are lower than those conforming to the Shannon criterion, no aliasing occurs, because all seven regions of the modulation transfer function are contained in a central section and do not overlap.

Figure 3:
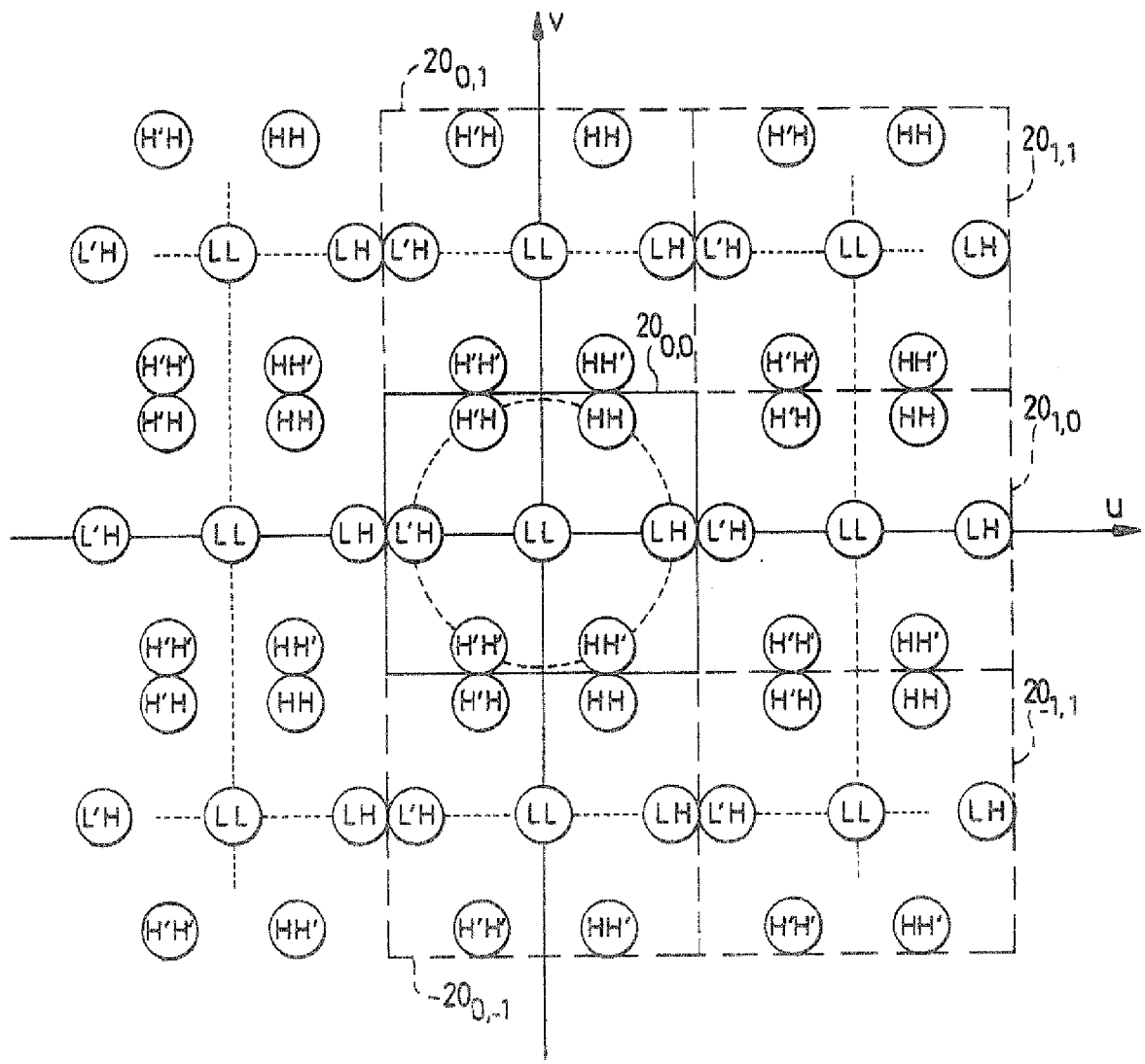
Figure 5A:
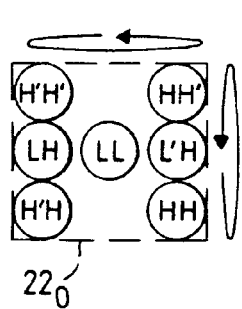
FIGS. 5a, 5b and 5c are diagrams illustrating a process for recovering the original spectrum with a view to reconstructing the image after using the method represented in FIG. 4, and FIGS. 6, 7, 8, 9, 10a, 10b and 10c are figures analogous to FIGS. 1, 2, 3, 4, 5a, 5b and 5c, respectively, for an interferometer with four pupils represented in FIG. 6.
Figure 5B:
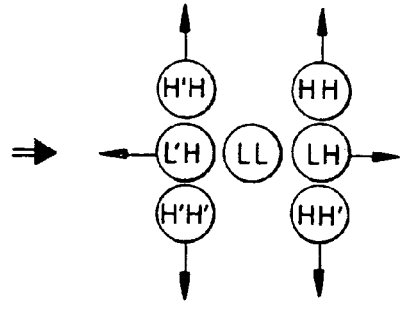
Figure 5C:
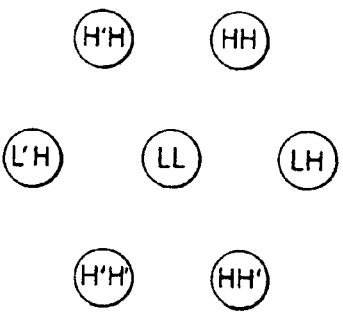

The procedure for reconstructing the image is then as represented in FIGS. 5a, 5b and 5c, that is to say, after obtaining the smaller central section $22_0$ (FIGS. 4 and 5a), the regions LL, LH, L'H, HH, H'H, HH' and H'H' are rearranged so that they are disposed in the manner represented in the section $20_0$ of FIG. 3, i.e. as in FIG. 5c. To this end, HH and HH' are interchanged, H'H' and H'H are interchanged, and LH and L'H' are interchanged. This achieves the disposition shown in FIG. 5b. It is then sufficient to move the central region LL away from the six peripheral regions H'H, HH, L'H, LH, HH' and H'H' to obtain the configuration represented in FIG. 5c, i.e. the starting configuration of the central section of the spectrum.

It has been found that, using this method, although the null transfer function portions contain energy coming from the noise present at all frequencies during sampling, the signal obtained is of the same quality, i.e. there is no loss of information, and of substantially the same amplitude as in the situation where sampling conforms to the Shannon criterion.

If $2D'=\sqrt{3}B'/4$, the ratio between the column sampling frequency conforming to the Shannon criterion (FIG. 3) and the sampling frequency determined using the method of the invention (FIG. 4) has the value $(8+\sqrt{3})/6 \approx 1.62$. Thus the period between the pixels may be increased in this ratio.

The relationship indicated above between D' and B' constitutes the maximum value of D' allowing use of the method conforming to the invention. This is because, for higher values of D', it is no longer possible to insert replicas in the central region.

For the rows, the same ratio is 5/3 (again assuming that $2D'=\sqrt{3}B'/4$). Thus the period between the rows of pixels may be increased by a factor of approximately 1.67.

The total number of pixels may therefore be reduced by a factor of $1.62 \times 1.67 = 2.7$ for a constant field.

Given that with this kind of sampling, and for a given field, the number of pixels is reduced, the size of the pixels may therefore be increased. In the case of a push-broom observation system, for which only one row of detectors is used, the integration time may be increased. Under these conditions, in the case of a push-broom system, the flux collected by each pixel is multiplied by $1.62 \times 1.67^2$ ($1.67^2$ is the result of the fact that the integration is effected along the columns). Thus the flux collected by each pixel is multiplied by a factor of approximately 4.52 compared to sampling conforming to the Shannon criterion. In the most favorable situation (in which the noise is independent of the area of the detector), the improvement in the signal to noise ratio is 4.52, while in the unfavourable situation (when the noise depends on the area of the detector), the signal to noise ratio improvement is $\sqrt{4.52}$, i.e. 2.13.

One example of an application of the invention to the situation where the interferometer comprises four pupils is described next with reference to FIGS. 6, 7, 8, 9 and 10a, 10b, 10c.

Figure 6:
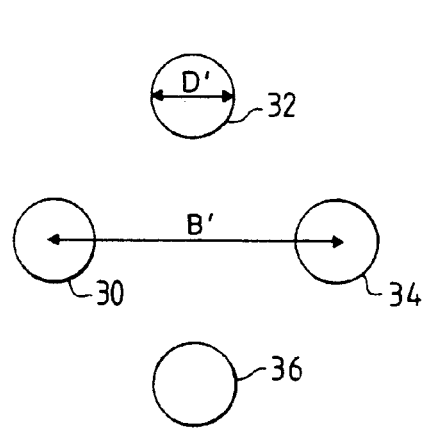

FIG. 6 shows an interferometer of this kind. It comprises four circular pupils 30, 32, 34 and 36 of diameter D' whose centers are disposed in a square of diagonal length B'; in this example, B'=4D', which is the minimum value of D' allowing use of the method conforming to the invention.

Figure 7:
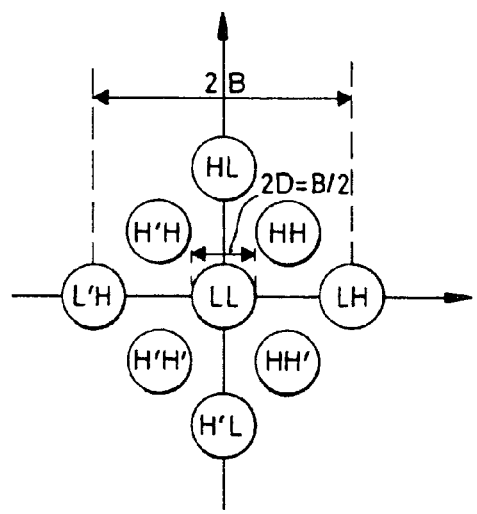

FIG. 7 shows the support of the modulation transfer function of an interferometer of this kind. This modulation transfer function comprises nine circular regions all having a diameter 2D (D=D'/λ), i.e. B/2 (B=B'/λ). In addition to the central region LL, the center of which is at the origin of the column and row frequencies, this MTF comprises two regions LH and L'H whose centers are on the abscissa axis. The center of the region LH is at the abscissa B and that of the region L'H is at the abscissa −B. Furthermore, two regions HL and H'L have their centers on the ordinate axis. The ordinate of the center of the region HL is +B and the ordinate of the region H'L is −B.

Figure 2:
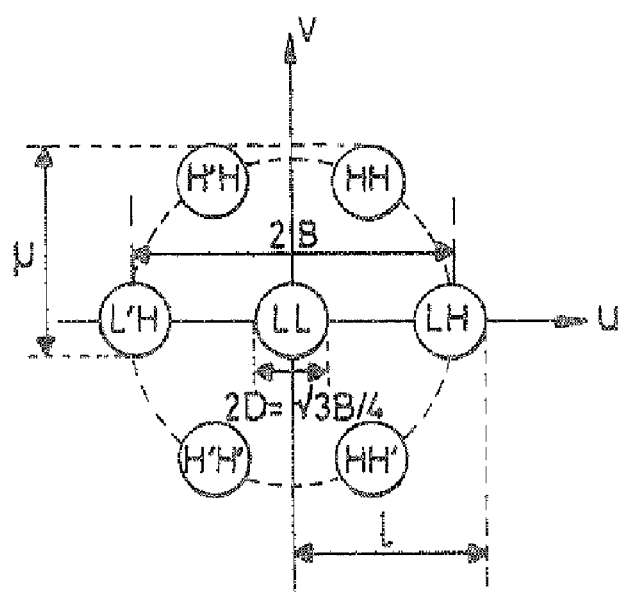
FIG. 2, already described, represents the support of the modulation transfer function before sampling of the interferometer represented in FIG. 1, FIG. 3, also described already, represents, for the interferometer represented in FIG. 1, the support of the spectrum after sampling conforming to the Shannon criterion.

The centers of the regions HL, LH, H'L and L'H therefore form a square and at the center of each side of this square is one of the centers of the four other circular regions HH, HH', H'H' and H'H. As in the FIG. 2 diagram, LH signifies a low row frequency and a high column frequency and HL signifies a high row frequency and a low column frequency.

If the sampling frequency conforms to the Shannon criterion with a minimum value 2B+2D in the columns and the rows, there are obtained for the MTF (see FIG. 8) a square central section $40_{0,0}$ and replicas $40_{1,0}$, $40_{1,-1}$, $40_{1,1}$, $40_{0,1}$, etc. of that square section, the subscripts having the same meaning as in the FIG. 3 diagram.

In this case, when the method conforming to the invention is applied, the same column and row sampling frequency may be chosen, and this sampling frequency may have a value such that, in the smaller central section, all the circular regions are tangential.

Figure 9:
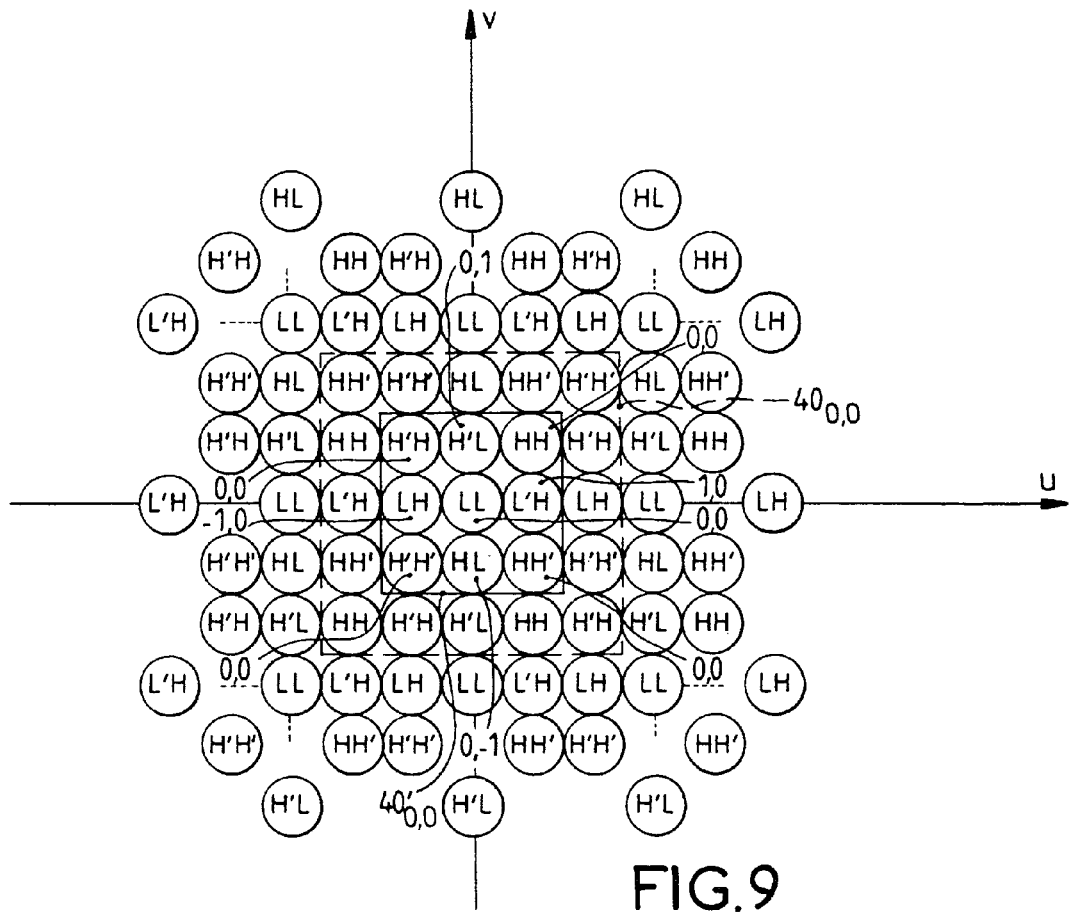
Figures 10A, 10B, 10C:
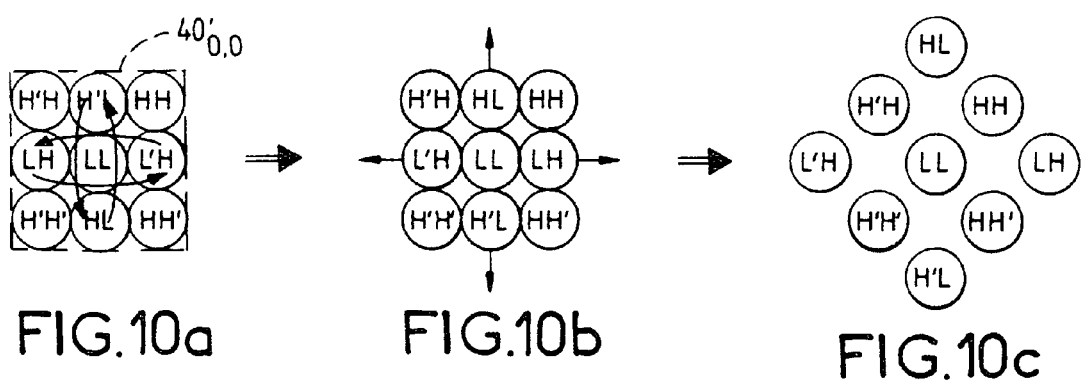

In the example represented in FIG. 9, the column and row sampling frequency is 6D. This results in a smaller central section $40'_{0,0}$ comprising a central region $LL_{0,0}$ and eight other peripheral circular regions HH, H'H, H'L, LH, L'H, H'H', HL and HH' coming from the central section and replicas. As in the FIG. 4 diagram, each circular region in the FIG. 9 diagram is assigned subscripts corresponding to the co-ordinates of the center of the region LL of the corresponding replica.

The smaller central section $40'_{0,0}$ comprises, in addition to the region $LL_{0,0}$, the regions $H'H_{0,0}$, $HH_{0,0}$, $H'H'_{0,0}$ and $HH'_{0,0}$. Furthermore, the region $HL_{0,-1}$ is between the regions $H'H'_{0,0}$ and $HH'_{0,0}$ and is tangential to them. This region is also tangential to the central region $LL_{0,0}$. The region $L'H_{1,0}$ is between the regions $HH_{0,0}$ and $HH'_{0,0}$ and is tangential to them and to the region $LL_{0,0}$. Similarly, the region $H'L_{0,1}$ is between the regions $H'H_{0,0}$ and $HH_{0,0}$ and is tangential to them and to the central region $LL_{0,0}$. Finally, the region $LH_{-1,0}$ is between the regions $H'H_{0,0}$ and $H'H'_{0,0}$ and is tangential to them and to the central region $LL_{0,0}$.

Figure 8:
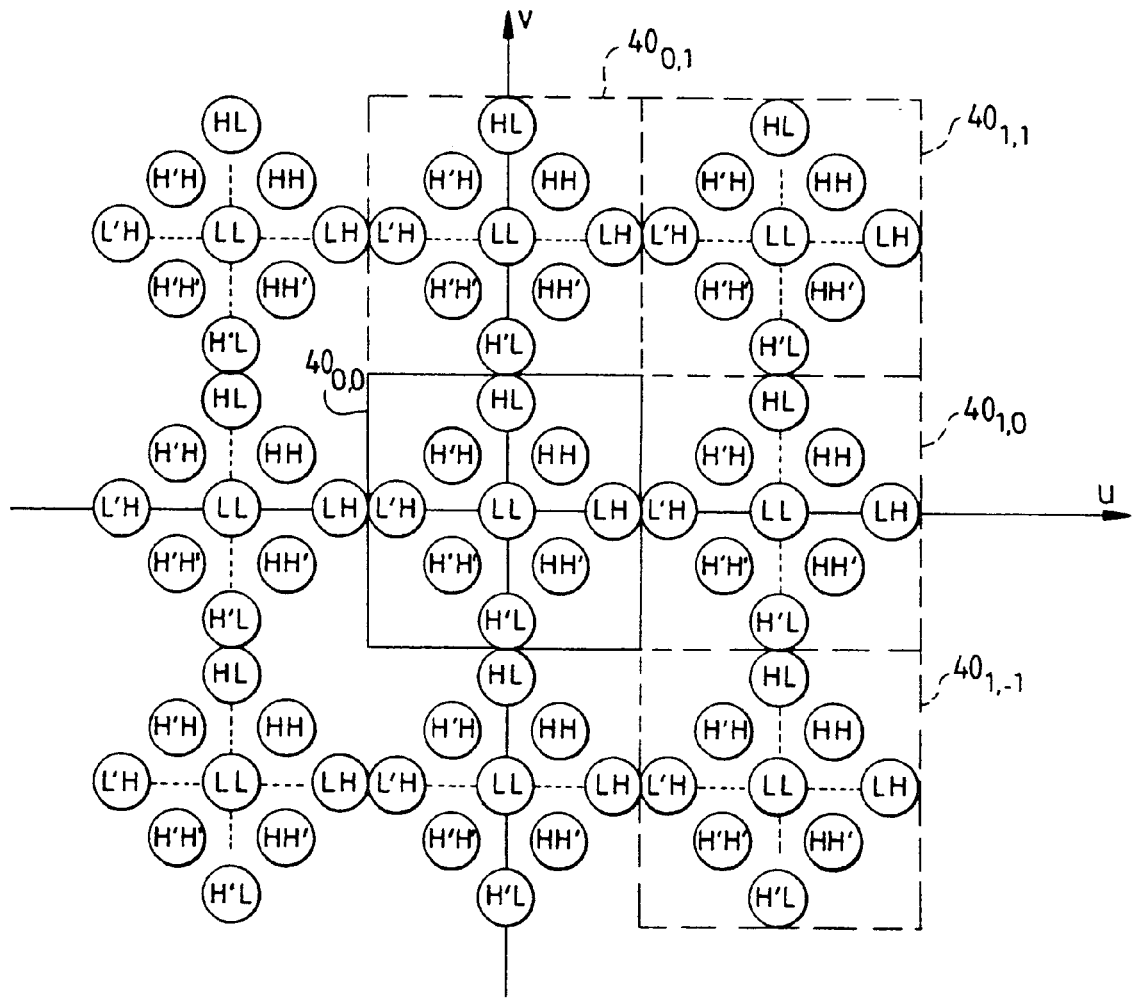

To reconstruct the image, it is necessary to reconfigure the smaller central section $40'_{0,0}$ so that the nine regions are distributed like the regions of the central section $40_{0,0}$ represented in FIG. 8. To this end, starting from the section $40'_{0,0}$ regions are interchanged so that the region HL is on the positive ordinate side and the region H'L on the negative ordinate side, and the regions LH and L'H are likewise interchanged. This yields the FIG. 10b configuration. It is then sufficient to position the regions HL, LH, L'H and H'L to obtain the configuration represented in FIG. 10c, corresponding to the central section $40_{0,0}$ represented in FIG. 8.

The value (6D) of the sampling frequency is equal to 5/3 times the value of the sampling frequency conforming to the Shannon criterion. Thus the period between pixels may be increased by a factor of approximately 1.67 and, at constant field, the total number of pixels necessary for sampling maybe reduced by $1.67^2=2.79$. Given that the size of the pixels may be increased and that the integration time may likewise also be increased in the case of a push-broom system, the flux collected by each pixel is multiplied by a factor of $1.67^2 \times 1.67 = 4.66$. The improvement in the signal to noise ratio is from 4.66 to 2.16.

Of course, the invention is not limited to a number of pupils equal to three or four. It applies regardless of the number of pupils of the interferometer or, more generally, of the synthetic aperture instrument. However, regardless of the embodiment, the ratio between the diameter of each pupil and the distance between the pupils must have a maximum value that can be determined easily so that the null transfer function regions are sufficiently extensive to enable insertion of the non-null replica transfer function supports into the central section of that MTF.

The invention claimed is:

1. An imager assembly comprising:
a synthetic aperture instrument comprising a plurality of separate pupils, and corresponding detectors, wherein:
the values of column and row sampling frequencies sampled by the detectors are less than values conforming to a Shannon criterion, such that modulation transfer function regions of replicas resulting from sampling are inserted into, and do not intersect with, null modulation transfer function regions of a first central section of the modulation transfer function regions, and wherein:
a second central section, having second central section regions, smaller than the first central section of the modulation transfer function regions contains all the null modulation transfer function regions representing the first central section; and
means for reconfiguring the spectrum of the image acquired to reconstruct said image, said means for reconfiguring being used to position the second central section regions to correspond to positions of the null modulation transfer function regions of the first central section.

2. Assembly according to claim 1 characterized in that the values of the sampling frequencies are such that in at least one of the row direction and the column direction, the second central section regions are tangential to each other.

3. Assembly according to claim 2 comprising four pupils each having a respective diameter D' and having respective centers disposed in accordance with a square of diagonal length B' such that: $2D'=B'/2$, the column and row sampling frequencies being 6D, where $D=D'/\lambda$, and $\lambda$ is a wavelength.

4. Assembly according to claim 1 comprising three pupils of diameter D' having respective centers disposed in accordance with an equilateral triangle of side length B' such that $2D'=\sqrt{3}B'/4$, wherein the column sampling frequency is substantially equal to $3B/2$ and the row sampling frequency is substantially equal to 6D, where $B=B'/\lambda$ and $D=D'/\lambda$, and $\lambda$ is a wavelength.

5. Assembly according to claim 1 characterized in that said imager assembly is of an interferometer type.

6. The assembly of claim 5, wherein said imaging assembly of the interferometer type comprises a telescopic type imaging assembly.

7. The assembly of claim 1, wherein when said imaging assembly includes an onboard instrument, said image is reconstructed terrestrially.

8. Method of determining an optical sampling frequency for use in an imaging assembly comprising a synthetic aperture type instrument comprising a plurality of pupils, said method comprising:
choosing said sampling frequency with a value lower than that imposed by the Shannon criterion and such that replicas adjoining the central section of the modulation transfer function overlap the central section so that the non-null transfer function regions of the replicas are inserted into, but do not intersect with, null transfer function regions of the central section, and so that a smaller section inside the central section contains all the non-null transfer function regions and null transfer function regions useful for reconstructing the modulation transfer function, wherein a number of pixels in an image generated by said imaging assembly is a function of said chosen sampling frequency.

9. Method according to claim 8, characterized in that the row and column sampling frequency is chosen so that in at least one of the row direction and the column direction, adjacent modulation transfer function regions of the smaller section are substantially tangential.

10. The method of claim 9, comprising disposing four pupils, each having a respective diameter D' and having respective centers, in accordance with a square of diagonal length B' such that: $2D'=B'/2$, the column and row sampling frequencies being 6D, where $D=D'/\lambda$, and $\lambda$ is a wavelength.

11. Method of reconstructing images according to claim 8, wherein the modulation transfer function is re-established from modulation transfer function regions in the smaller section.

12. The method of claim 8, wherein said imaging assembly is of an interferometer type.

13. The method of claim 12, wherein said imaging assembly of the interferometer type comprises a telescopic type imaging assembly.

14. The method of claim 8, comprising disposing three pupils of diameter D' having respective centers in accordance with an equilateral triangle of side length B', such that $2D'=\sqrt{3}B'/4$, wherein the column sampling frequency is substantially equal to $3B/2$ and the row sampling frequency is substantially equal to 6D, where $B=B'/\lambda$ and $D=D'/\lambda$, and $\lambda$ is a wavelength.

15. The method of claim 8, wherein when said imaging assembly includes an onboard instrument, reconstruction of said image is performed terrestrially.

* * * * *